United States Patent [19]
Irwin

[11] Patent Number: 4,974,117
[45] Date of Patent: Nov. 27, 1990

[54] DUAL DIAPHRAGM CAPACITIVE DIFFERENTIAL PRESSURE TRANSDUCER

[75] Inventor: Craig W. Irwin, Fillmore, Calif.

[73] Assignee: Kavlico Corporation, Moorpark, Calif.

[21] Appl. No.: 472,821

[22] Filed: Jan. 31, 1990

[51] Int. Cl.⁵ ................................................ G01L 9/12
[52] U.S. Cl. ........................................ 361/283; 73/718
[58] Field of Search ................... 361/283; 73/718, 724

[56] References Cited
U.S. PATENT DOCUMENTS

| | | | |
|---|---|---|---|
| 3,858,097 | 12/1974 | Polye | 361/283 |
| 4,422,125 | 12/1983 | Antonazzi et al. | 361/283 |

*Primary Examiner*—Donald A. Griffin
*Attorney, Agent, or Firm*—Poms, Smith, Lande & Rose

[57] ABSTRACT

The invention provides a pressure transducer with two mainly identical ceramic members located opposite each other in a housing. Substantially cylindrical recesses are provided in each of the ceramic members, the innermost delimiting walls of each recess forming a thin diaphragm. Each diaphragm is provided with a conductive coating, and contact elements electrically connect each conductive coating with circuitry for determining differential capacitance. The recesses and the housing form first and second pressure chambers which are connected via a channel provided through the two ceramic members. Spacing material maintains the ceramic members at a constant spacing and also seals their periphery. Together with the inner walls of the diaphragms, the sealing material delimits an inner pressure chamber. A first port connects the first pressure chamber with a first external pressure source. A second channel connects the inner pressure chamber with a second external pressure source. In the preferred embodiment, the difference between a test pressure applied to the first and second pressure chambers and the reference pressure applied to the inner chamber is a function of the distance between the diaphragms, which changes as the diaphragms flex due to the pressure difference.

17 Claims, 1 Drawing Sheet

DUAL DIAPHRAGM CAPACITIVE DIFFERENTIAL PRESSURE TRANSDUCER

FIELD OF THE INVENTION

This invention relates to a dual-diaphragm differential pressure transducer of the capacitive type.

BACKGROUND OF THE INVENTION

Capacitive pressure transducers are widely used. In one known type of capacitive transducer, two planar layers of a conductive material are held substantially parallel to each other, separated by a narrow dielectric gap. The conductive layers are normally formed as coatings on respective diaphragm members. In a single-diaphragm transducer, one member is rigid, whereas the other is able to flex. The space between the members may be evacuated or may be at a reference pressure, and the test pressure, that is, the pressure to be measured, is applied to the outer side of the flexible diaphragm member. The greater the test pressure, the more the flexible member will flex toward the rigid member, and the greater the capacitance of the members will be. By comparing the capacitance of the members with a reference capacitance, the test pressure may then be determined.

Single-diaphragm capacitive pressure transducers suffer from several drawbacks. First, flexure of the one diaphragm member due to inertial and gravitational forces is indistinguishable from flexure due to actual pressure differentials over the members. Second, the sensitivity of single-diaphragm transducers is less than if both diaphragm members were allowed to flex.

In response to the shortcomings of single-diaphragm transducers, numerous double-diaphragm transducers have been developed. U.S. Pat. No. 3,858,097 (Polye, Dec. 31, 1974) and U.S. Pat. No. 4,422,125 (Antonazzi et al., Dec. 20, 1983) describe representative double-diaphragm transducers, in which conductive coatings are applied to two opposing, parallel, flexible diaphragm members. A reference pressure is created in the dielectric space between the two members The effect of gravity and of inertial forces is greatly reduced in these double-diaphragm devices since both diaphragm members will be affected approximately equally, with mainly only pressure differentials causing the members to move toward or away from each other.

The useful range of these known transducers is limited, however, by the fact that the reference pressure is fixed between the two diaphragm members. Increasing the stiffness of the members (for example, by making them thicker) makes it possible for the diaphragm to withstand and measure higher pressures above the reference pressure, but the sensitivity of the device decreases. Increasing the flexibility of the members increases sensitivity, but not only decreases the measurable pressure range (since, above a certain pressure, the members will touch and short-circuit, or will crack) but also makes the members more vulnerable to damage. What is needed is a pressure transducer which provides great sensitivity in pressure changes about a reference pressure which is externally variable.

The object of this invention is to provide a double-diaphragm pressure transducer which is easy to manufacture, which has improved sensitivity relative to the prior art, and which enables both the reference pressure and the test pressure to be varied easily.

SUMMARY OF THE INVENTION

The invention provides a pressure transducer with two mainly identical ceramic members located opposite each other in a housing. Substantially cylindrical recesses are provided in each of ceramic members, the innermost delimiting walls of each recess forming a thin diaphragm. Each diaphragm is provided with a conductive coating, and contact elements electrically connect each conductive coating with circuitry for determining differential capacitance.

The recesses and the housing form a first and second pressure chambers which are connected via a channel provided through the two ceramic members. Spacing material maintains the ceramic members at a constant spacing and also seals their periphery. Together with the inner walls of the diaphragms, the sealing material delimits an inner pressure chamber. A first port connects the first pressure chamber with a first external pressure source. A second channel connects the inner pressure chamber with a second external pressure source.

In the preferred embodiment, the difference between a reference pressure applied to the first and second pressure chambers and the test pressure applied to the inner chamber is a function of the distance between the diaphragms, which changes as the diaphragms flex due to the pressure difference.

DETAILED DESCRIPTION

Figure 1:
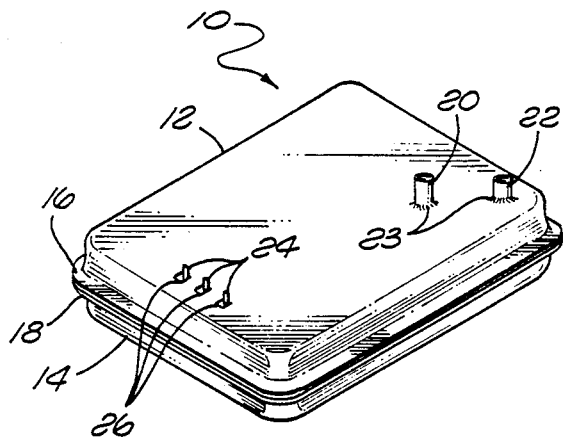
FIG. 1 is a perspective view of an illustrative embodiment of an assembled pressure transducer according to the invention.

FIG. 1 is a perspective view of a preferred, advantageous, illustrative embodiment of an assembled pressure transducer according to the invention. The transducer is designated generally by reference numeral 10. The transducer includes a housing, which comprises an upper housing member 12 and a lower housing member 14. It is to be understood that the terms "upper" and "lower" are used only for the sake of clarity and to correspond to the drawings; indeed, one of the advantages of the transducer 10 is that it is equally accurate regardless of orientation. The housing is preferably metallic so as to form an electric shield and eliminate the possibility of faulty measurements because of external capacitances. The upper and lower housing members 12, 14 are joined along respective flanges 16, 18.

A first port 20 and a second port 22 extend through corresponding openings in the upper housing member 12. The openings are preferably sealed, for example using soldered fillets 23. The ports 20, 22, constitute the external openings through which first and second pressures may be applied to the interior of the transducer, as is described in detail below. Outer electrical contacts 24 extend through openings 26 in the upper housing member 12.

Figure 2:
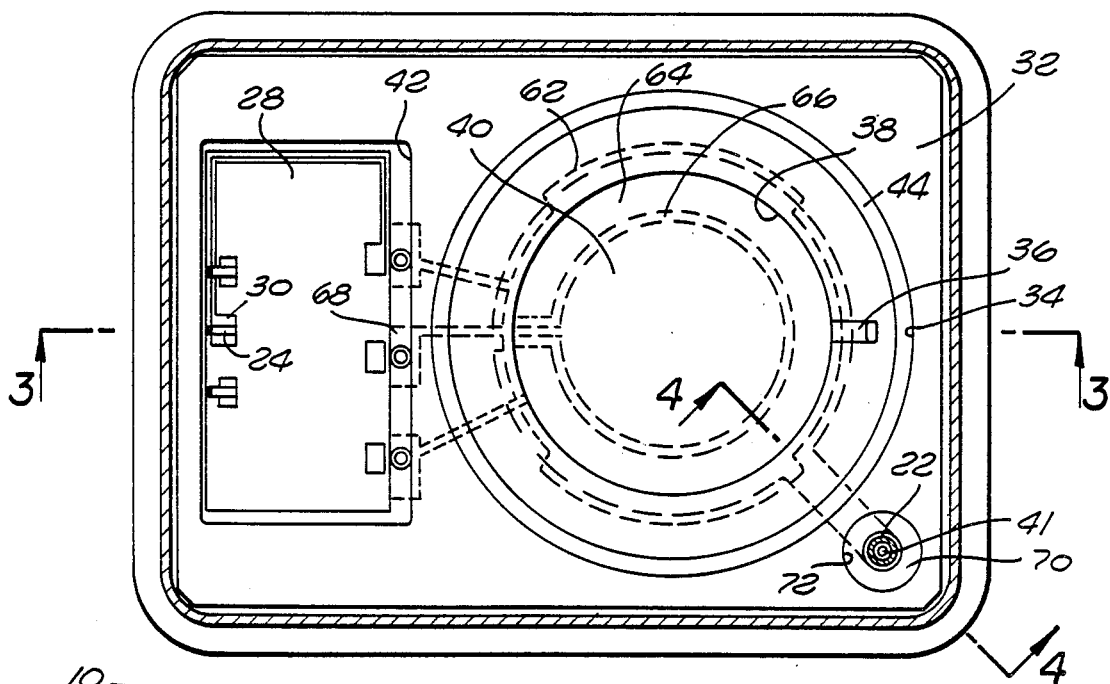
FIG. 2 is a view from above of the internal configuration of the transducer in FIG. 1, viewed along the section line 2—2 in FIG. 3.

FIG. 2 is a view from above of the internal configuration of the transducer in FIG. 1, that is, a view of the transducer as it would approximately appear from above with the upper housing member 12 partially cut away.

A hybrid electronic circuit for detecting differential capacitance is indicated generally by reference numeral 28. This hybrid circuit may be of a known type which converts differential capacitance to a voltage or current signal proportional to the difference in capacitance. The hybrid circuit includes a lead 30 from each of the external electrical contacts 24 to corresponding contacts and conductive surfaces to be described below.

An upper ceramic member 32 forms one of the two main bodies contained within the transducer housing. The upper ceramic member 32 is made preferably of alumina and has an outer 0-ring groove 34; an outer channel 36 which extends through the member 32; and an upper, substantially cylindrical recess 38. The circular bottom portion of the upper recess 38 forms an upper diaphragm 40, which is preferably bevelled or rounded at its outer circumference to lessen strain. An inner channel 41, which may be made simply as a bored hole, leads to the second port 22 (see FIG. 1), and extends through the upper ceramic member 32. The upper member 32 furthermore includes a recess 42 in which the hybrid circuit 28 is mounted.

Figure 3:
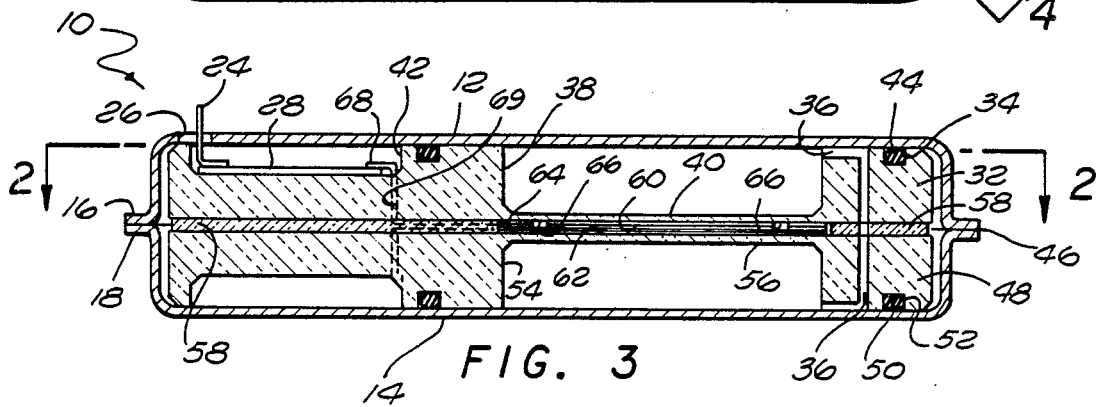
FIG. 3 is a cross-sectional view of the transducer taken along line 3—3 in FIG. 2, and particularly illustrating an inner pressure channel.

The cross-sectional view of the transducer 10 shown in FIG. 3 shows the general configuration of the upper ceramic member 32, as well as the outer channel 36 and the various recesses in the upper member. FIG. 3 also shows an O-ring 44 mounted in the groove 34 for sealing the upper recess 38 against pressure leaks along the inner wall of the upper housing member 12. The upper recess 38 and the inner surface of the upper housing member 12 thus form an upper pressure chamber. As FIG. 3 shows, the upper and lower housing members 12, 14 are preferably sealed with solder 46 between and around the flanges 16, 18.

The transducer 10 includes a lower ceramic member 48, which preferably is manufactured substantially identical to the upper ceramic member 32. An O-ring 50 seats in an annular groove 52 in the lower ceramic member 48 for sealing a lower, mainly cylindrical recess 54 against pressure leaks along the inner wall of the lower housing member 14. The lower recess 54 and the inner surface of the lower housing member 14 thus form a lower pressure chamber. The upper and lower pressure chambers are referred to collectively below as the "outer pressure chambers". The circular inner portion of the lower recess 54 forms a lower diaphragm 56. Constant and temperature insensitive spacing between the upper and lower ceramic members 32, 48 is provided by spacing 58 of glass frit.

The lower surface of the upper diaphragm 40 is provided with a substantially circular, planar, upper conductive coating 60. Directly opposing and mainly parallel to this upper conductive coating 60 is a substantially circular, planar, conductive lower coating 62, which preferably constitutes a ground coating 62. A dielectric, such as a thin coating of glass, is preferably provided covering the ground coating. In the preferred embodiment, the electrical potential of the ground coating will be the ground reference potential. An annular conductive reference coating 64 is also provided on the lower surface of the upper diaphragm 40, disposed radially outward from the upper coating 60 and separated therefrom by an annular insulating space 66. A dielectric such as a thin coating of glass is preferably provided covering both the ground coating 62 and the reference coating 64. A contact 68 extends through a hole or narrow slot 69 in the upper ceramic member 32, and electrically connects the annular conductive reference coating 64 with the hybrid circuit 28. Corresponding contacts are provided for the upper and lower conductive coatings 60, 62, and are indicated by dashed lines in FIG. 2. The connections to the conductive layers 60, 62 and 64 constitute extensions of the conductive layers, sealed by the glass frit, with short leads such as lead 68 connected to the conductive extensions, and to the circuit chip 28.

Figure 4:
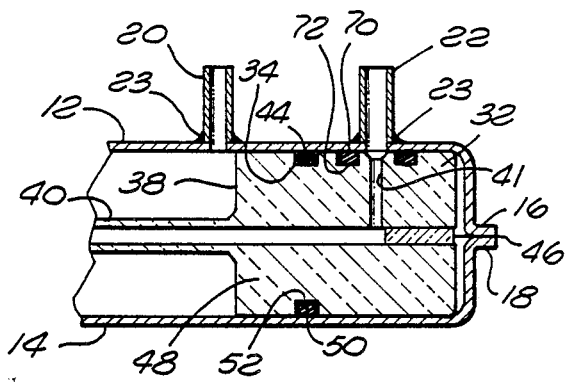
FIG. 4 is a cross-sectional view of the transducer taken along line 4—4 in FIG. 2, and particularly illustrating an outer pressure channel.

The region delimited by the upper and lower diaphragms 40, 56, and the frit 58 (that is, the thin, disk-shaped region between the conductive coatings 60, 62, and 64), constitutes an inner pressure chamber. The pressure in the inner pressure chamber will normally be the reference pressure $P_r$, that is, the pressure relative to which the test pressure is to be measured by the transducer. The manner in which pressure may be applied to this inner pressure chamber is illustrated in FIG. 4. In FIG. 4, the upper and lower coatings (60 and 62 in FIG. 3) have been deleted only for the sake of clarity of explanation. As FIG. 4 shows, the inner channel 41 extends through the upper ceramic member 32 substantially perpendicular to the planar lower surface of the upper ceramic member, and opens upward into the second port 22 and downward into the inner pressure chamber. In order to seal off the inner channel from the upper pressure chamber (the upper recess 38), an additional O-ring 70 may be mounted in a corresponding annular groove 72 in the upper ceramic member 32.

FIGS. 3 and 4 show the way in which pressure is applied to the upper and lower pressure chambers (the upper and lower recesses 38, 54, respectively), and the way in which pressure is maintained the same in each of these outer chambers. As seen in FIG. 4, the first port 20 opens into the upper chamber. As FIG. 3 shows, however, the upper chamber is in communication with the lower chamber through the outer channel 36, which also passes through the glass frit 58. The pressure in the upper and lower chambers is preferably the test pressure $P_t$.

The operation of the transducer will now be described with reference primarily to FIGS. 3, 4. A source of reference pressure (not shown) is connected using known methods to the second port 22. The reference pressure Pr is thereby communicated to the inner pressure chamber.

The first port 20 is then connected to a source of test pressure Pt. In many applications, the test pressure Pt will be the ambient pressure, in which cases the first port 20 may simply be left open and need not be connected to any pressure transmitting pipe or hose. Such pipes or hoses may, however, easily be connected using known methods to the first port, if the source of test pressure is located at a distance from the transducer itself. The test pressure is then communicated to the outer pressure chambers through the outer channel 36, which is preferably large enough in cross section to transmit pressure fluctuations rapidly and without increase due to constriction.

If Pr=Pt, no pressure-induced resultant force will act on the upper and lower diaphragms 40, 56, which will therefore remain essentially parallel. As Pt increases above Pr, however, the diaphragms 40, 56 will be forced toward each other. This will in turn decrease the distance between the conductive coatings 60, 62, and will cause an increase in the capacitance Ct of the conductively coated diaphragms.

Since the annular conductive reference coating 64 is located radially at or beyond the outer circumference of the upper recess 38 where the upper and lower ceramic members 12, 14, thicken and become relatively rigid, the distance between the reference coating 64 and the lower, conductive ground coating 62 will not change significantly as Pt varies relative to Pr. A reference capacitance Cr is thereby established over the annular conductive reference coating 64 and the conductive ground coating 62.

As Pt increases above Pr, the diaphragms 40, 56 are forced toward each other. This will in turn decrease the distance between the conductive coatings 60, 62, and will cause an increase in the capacitance Ct of the conductively coated diaphragms.

The capacitances Cr and Ct are sensed by the hybrid circuit 28 through the electrical contacts provided for each of the conductively coated surfaces. Typically, this is done by applying a periodic electrical signal over both the reference and ground coatings 64 and 62, respectively, and also over the flexing conductive coating 60 and the ground coating, respectively. Differences between Pt and Pr will lead to corresponding differences in capacitance between Ct and Cr. The hybrid circuit or external circuitry, senses these changes in capacitance which are converted into corresponding varying voltage or current signals.

The transducer according to the invention thus does not rely on an in-built reference pressure, but rather different reference pressures may be applied through the second port as described above. Also, because the diaphragms 40, 56, being located at the innermost portions of the recesses 38, 54, are thus located at a significant distance from the housing, they are better protected from damage than are double diaphragms according to the prior art. It has thus been found possible to make the diaphragms extremely thin, and to mount them extremely close to each other so as to provide improved sensitivity compared with transducers according to the prior art. Furthermore, manufacture of the transducer according to the invention is greatly simplified by the upper and lower ceramic members 12, 14 being essentially identical.

In a practical embodiment of the transducer according to the invention, the upper and lower ceramic members were made of alumina and were approximately 2.55 inches by 1.80 inches, and were about 0.250 inches thick. Each recess 38, 54 was 0.225 inches deep and was about 0.750 inches in diameter. The upper and lower diaphragms 40, 56 were 10 mil thick or less, and the distance between opposing conductive surfaces varied between 0.5 and 20 thousandths of an inch. Using this design, it is possible to measure accurately pressures of only a few inches of water as a full reading.

It is advantageous but not necessary for the transducer to incorporate the reference capacitor (formed by the reference and ground coatings) as described above; instead, a fixed capacitor may be used as the capacitive reference. In this case, the upper conductive coating may be extended to or even beyond the circumference of the upper recess 38. It is further noted that the sensor of the present invention can detect differential pressures generally; and, when a reference potential is used, it may be applied to either input port, with the variable pressure applied to the other input port. Also, differently led or multiple channels may be used to connect the upper and lower recesses for pressure equalization Accordingly, the present invention is not limited precisely to the embodiment illustrated in the drawings.

What is claimed is:

1. A pressure transducer including:
   a housing;
   a first ceramic member provided with a first substantially cylindrical recess with a first inner wall forming a first diaphragm, an inner surface of said first inner wall being provided with a first conductive coating forming a first capacitive layer, and said first recess and said housing delimiting a first pressure chamber;
   a second ceramic member disposed opposite to said first ceramic member and provided with a second substantially cylindrical recess with an inner second wall forming a second diaphragm, an inner surface of said second inner wall being provided with a second conductive coating forming a second capacitive layer, and said second recess and said housing delimiting a second pressure chamber;
   spacer means for maintaining said first and second ceramic members at a constant spacing, for sealing the periphery of said first and second ceramic members, and, together with said first and second diaphragms, for delimiting an inner pressure chamber;
   first port means for connecting said first pressure chamber with a first external pressure source;
   first channel means for connecting and equalizing the pressure in said first and second pressure chambers;
   second channel means for connecting said inner pressure chamber with a second external pressure source;
   electrical contact means for electrically connecting said first and second conductive coatings with means for determining differential capacitance;
   sealing means for sealing off said first and second pressure chambers from said first channel means;
   said inner surface of said first diaphragm further including an annular conductive reference coating opposing said second conductive coating and disposed radially outward from and electrically insulated from said first conductive coating;
   said first channel means comprising substantially joining L-shaped channels in said first and second ceramic members and consisting of a radial recess and an axial bore in each of said first and second ceramic members;
   said second channel means comprising a bore extending through said first ceramic member; and
   said first and second ceramic members being substantially rectangular and identical.

2. A pressure transducer including:
   a housing;
   a first ceramic member provided with a first substantially cylindrical recess with a first inner wall forming a first diaphragm, an inner surface of said first inner wall being provided with a first conductive coating forming a first capacitive layer, and said first recess and said housing delimiting a first pressure chamber;
   a second ceramic member disposed opposite to said first ceramic member and provided with a second substantially cylindrical recess with an inner second wall forming a second diaphragm, an inner surface of said second inner wall being provided with a second conductive coating forming a second capacitive layer, and said second recess and said housing delimiting a second pressure chamber;

spacer means for maintaining said first and second ceramic members at a constant spacing, for sealing the periphery of said first and second ceramic members, and, together with said first and second diaphragms, for delimiting an inner pressure chamber;

first port means for connecting said first pressure chamber with a first external pressure source;

first channel means for connecting and equalizing the pressure in said first and second pressure chambers;

second channel means for connecting said inner pressure chamber with a second external pressure source; and electrical contact means for electrically connecting said first and second conductive coatings with means for determining differential capacitance.

3. A pressure transducer as defined in claim 2, said inner surface of said first diaphragm further including an annular conductive reference coating opposing said second conductive coating and disposed radially outward from and electrically insulated from said first conductive coating.

4. A pressure transducer as defined in claim 2, said first channel means comprising substantially joining L-shaped channels in said first and second ceramic members and consisting of a radial recess and an axial bore in each of said first and second ceramic members.

5. A pressure transducer as defined in claim 2, said second channel means comprising a bore extending through said first ceramic member 6. A pressure transducer as defined in claim 2, including sealing means for sealing off said first and second pressure chambers from said first channel means.

7. A pressure transducer as defined in claim 2, said first and second ceramic members being substantially identical.

8. A pressure transducer as defined in claim 2, said first and second ceramic members being made of alumina.

9. A pressure transducer as defined in claim 2, said first and second ceramic members being substantially rectangular.

10. A pressure transducer as defined in claim 2, said spacing means consisting of glass frit.

11. A pressure transducer as defined in claim 2, including mounting means for mounting said means for determining differential capacitance within said housing.

12. A pressure transducer as defined in claim 11, said mounting means comprising a recess in said first ceramic member.

13. A pressure transducer including:
a housing;
a first ceramic member provided with a first substantially cylindrical recess with a first inner wall forming a first diaphragm, an inner surface of said first inner wall being provided with a first conductive coating forming a first capacitive layer, and said first recess and said housing delimiting a first pressure chamber;

a second ceramic member disposed opposite to said first ceramic member and provided with a second substantially cylindrical recess with an inner second wall forming a second diaphragm, an inner surface of said second inner wall being provided with a second conductive coating forming a second capacitive layer, and said second recess and said housing delimiting a second pressure chamber;

spacer means for maintaining said first and second ceramic members at a constant spacing, for sealing the periphery of said first and second ceramic members, and, together with said first and second diaphragms, for delimiting an inner pressure chamber;

first port means for connecting said first pressure chamber with a first external pressure source;

first channel means for connecting and equalizing the pressure in said first and second pressure chambers;

second channel means for connecting said inner pressure chamber with a second external pressure source;

electrical contact means for electrically connecting said first and second conductive coatings with means for determining differential capacitance;

said first and second ceramic members having smooth flat surfaces facing one another, and said members both being substantially rectangular in configuration;

said ceramic members having resilient means sealing around said cylindrical recesses between said members and said housing; and at least one of said ceramic members having a recess spaced from said cylindrical recess for mounting electrical processing circuitry connected to said conductive coatings.

14. A pressure transducer as defined in claim 13, said first channel means comprising substantially joining L-shaped channels in said first and second ceramic members and consisting of a radial recess and an axial bore in each of said first and second ceramic members.

15. A pressure transducer as defined in claim 13, said first and second ceramic members being substantially identical.

16. A pressure transducer as defined in claim 13, said first and second ceramic members being made of alumina.

17. A pressure transducer as defined in claim 13, said spacing means consisting of glass frit.

* * * * *